MULTIFREQUENCY INBAND TELEPHONE SIGNALING SYSTEMS

Filed Dec. 27, 1965 Sheet 1 of 2

INVENTOR
L. C. J. ROSCOE
BY R. B. Ardis
ATTORNEY

FILTER CHARACTERISTICS

2600 CPS SIGNAL ENERGY

GUARD ENERGY

SUM GUARD ENERGY

2400 CPS SIGNAL/SUM GUARD RATIO

2400 CPS SIGNAL/GUARD RATIO

United States Patent Office 3,428,757
Patented Feb. 18, 1969

3,428,757
MULTIFREQUENCY INBAND TELEPHONE SIGNALING SYSTEMS

Lawrence C. J. Roscoe, North Brunswick, N.J., assignor to Bell Telephone Laboratories, Incorporated, New York, N.Y., a corporation of New York Filed Dec. 27, 1965, Ser. No. 516,338
U.S. Cl. 179—84 4 Claims
Int. Cl. H04m *1/50*

ABSTRACT OF THE DISCLOSURE

The invention relates to receivers for voice-frequency control signals in which talk-off is prevented by means of a guard circuit. The level of the signal at the signal frequency is compared with the level of the sum of the guard signal and other signal frequencies of higher frequency.

This invention relates generally to signaling receivers in telephone transmission systems and, more specifically, to multifrequency signaling receivers having improved performance characteristics.

Signaling, in telephone parlance, refers to the transmission of control information ancillary to voice-frequency message waves. Typical signaling information includes that needed to establish, maintain, and terminate each telephone conversation. Because most present day long distance telephone trunks use carrier transmission, the most common signaling arrangements make use of at least one substantially single-frequency inband tone to transmit the necessary control information. However, in some cases signaling may be performed by more than one inband tone, as for instance in the overseas dialing system in which two inband tones are utilized for this purpose. Such signaling arrangements are fully compatible with carrier trunks because the tones can be transmitted in exactly the same way as the voice-frequency message waves. The signaling tones are designated as inband simply because the signals for a particular channel are sent in the same frequency band as the associated voice-frequency message, rather than as D-C or in some higher frequency band.

In a typical inband multifrequency signaling system, for instance, either one or a combination of tones is transmitted over the telephone trunk from one central office to another to indicate a particular trunk condition. Whenever the voice-frequency message waves contain sufficient energy of at least one of the signaling frequencies, however, false trunk condition indications can result. To avoid such false trunk indications most inband signaling systems make use of guard and signal detection circuits at the receiving terminal. The signal detection circuits detect the energy in the frequency band at the respective signaling frequencies, whereas the guard circuit detects the energy in the remainder of the frequency band outside of the signal frequencies. In such systems a particular trunk condition is permitted only when the ratio of the energy at a signaling frequency to the ratio of the guard energy exceeds a predetermined value for at least a minimum length of time. During the periods in which the signal-to-guard ratio exceeds the threshold value, the entire input to the receiving terminal is routed through the serially connected band-elimination filters, which are individually tuned to respective signal frequencies. All signal frequency components are therefore kept from the receiving terminal during these periods, whereas during the remainder of the transmission the entire received frequency spectrum is applied.

In multifrequency signaling systems particular problems are introduced in that the respective signaling frequencies are located relatively close together within the particular voice-frequency band. In at least one two-frequency inband signaling system, the two signaling frequencies are, for instance, 240 c.p.s. and 2600 c.p.s.; that is, the signaling frequencies are separated by but 200 c.p.s. The signal receiver must therefore be sufficiently selective to differentiate accurately and without fail between the two signaling frequencies.

One object of the present invention is to enable a multifrequency inband signaling receiver to respond accurately to closely spaced individual signaling frequencies.

Another object of the invention is to render such a signaling receiver sufficiently selective without having to incorporate highly selective filters.

To fulfill these objects, the invention features in a multifrequency inband signaling system the addition of specific signal frequency components to the basic "guard" energy to create "sum-guard" energy. The subsequent comparison of this "sum-guard" energy with a specific signal energy enables the signaling receiver to distinctly and reliably differentiate between respective signaling frequency components. The creation of the "sum-guard," therefore, enhances the selectivity of the signaling receiver to the required degree, without requiring the use or addition of highly selective filters.

More specifically, one embodiment of the invention provides in a two-frequency inband signaling system for two signal detection circuits to detect the respective signal frequencies, a guard detection circuit to detect the remaining energy within the channel, and comparators for determining the so-called signal-to-guard ratio for each signal frequency.

Band-elimination filters tuned to the respective signal frequencies, i.e., 2400 c.p.s. and 2600 c.p.s., are connected in tandem to eliminate the two signal frequencies from the guard energy. The signal detection circuits, which include bandpass filters tuned to the respective signal frequencies, are connected at the input sides of the respective band-elimination filters, and the guard detection circuit is connected at the output side of the second of the two band-elimination filters. In accordance with the invention, the selectivity requirements placed on the band-elimination filters and on the bandpass filters in the two signal detection circuits are relaxed considerably by adding the output of the second signal detection circuit to the output of the guard detection circuit at the comparator for the first signal frequency. In this manner high effective selectivity is attained without any necessity for employing highly selective bandpass filters.

The above and other features of the invention will be more fully understood from the following detailed description considered in conjunction with the drawings in which.

Figures 1, 2:
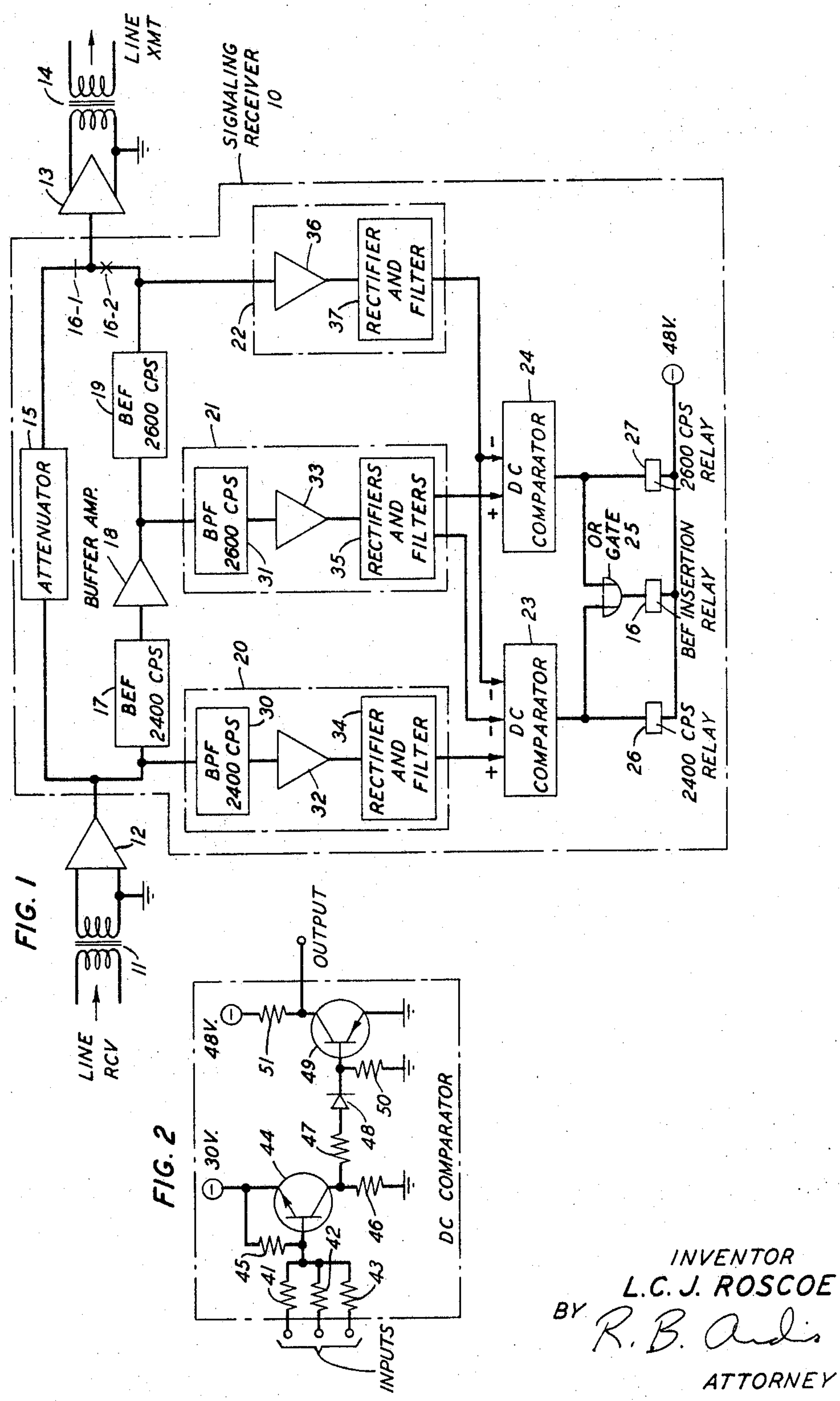
FIG. 1 illustrates a two-frequency inband signaling receiver embodying the invention.
FIG. 2 shows circuit details of a specific D-C comparator used in the embodiment of the invention illustrated in FIG. 1.

In FIG. 1 a complete two-frequency signaling receiver 10 together with its associated input and output circuitry is illustrated. The input or receiving line is connected to the primary winding of transformer 11, the secondary winding of which is connected to a receiving preamplifier 12. The output of preamplifier 12, is, in turn, routed to receiving amplifier 13 through signaling receiver 10. The output of receiving amplifier 13 is finally supplied to the receiving portion of a local central office through transformer 14.

Within signaling receiver 10 two alternate paths are provided for the input to the signaling receiver. The first path is through linear attenuator 15 and break contact 16–1 (open when the relay is energized) of band-elimination filter insertion relay 16. The second path, on the other hand, routes the input of the signaling receiver through the serially connected arrangement of 2400 c.p.s. band-elimination filter 17, buffer amplifier 18, 2600 c.p.s. band-elimination filter 19, and make contacts 16–2 (closed when the relay is energized) of band-elimination filter insertion relay 16, respectively. Attenuator 15 serves to isolate the input of the signaling receiver from its output during the relay energizing period and functions further to equalize the output of path 1 to that of path 2. The entire frequency spectrum of the input to the signaling receiver is therefore passed through the first path when relay contact 16–1 is closed, subject only to equal attenuation over its entire frequency band by attenuator 15. When, on the other hand, relay contact 16–2 is closed so that the input passes through the second path, band-elimination filters 17 and 19 substantially suppress all signal components of the input, i.e., components at the frequencies of 2400 c.p.s. and 2600 c.p.s.

It is therefore evident that in the one instance the signaling receiver has an output comprising energy at the entire frequency band of the particular channel, whereas in the other instance, all signaling frequency components are substantially eliminated.

Selection of a particular path is accomplished in combination by 2400 c.p.s. signal detection circuit 20, 2600 c.p.s. signal detection circuit 21, guard detection circuit 22, together with the respective D-C comparators 23 and 24 as well as OR-gate 25, and band-elimination filter insertion relay 16. D-C comparators 23 and 24 in addition to energizing relay 16 also drive 2400 c.p.s. relay 26 and 2600 c.p.s. relay 27, respectively, where these relays may be utilized to perform required circuit functions. The 2400 c.p.s. and 2600 c.p.s. signal detection circuits each comprise bandpass filters 30, 31, amplifiers 32, 33, as well as rectifier and filter circuits 34, 35, respectively. Amplifier 36 and rectifier and filter circuit 37 on the other hand make up the guard detection circuit.

Figure 3A:
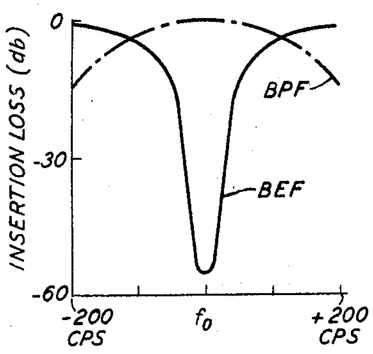
FIGS. 3A through 3F show waveforms illustrating the operation of the embodiment of the invention of FIG. 1.

The input to 2400 c.p.s. detection circuit 20 is in parallel with the input to the serially connected band-elimination filters; that is, the input consists of the overall trunk input energy, which is the sum of the voice-frequency message and the signal frequency components. The 2400 c.p.s. signal component, after having been selected from this input in bandpass filter 30, is amplified in amplifier 32, and rectified as well as filtered in rectifier and filter 34. The output of the 2400 c.p.s. detection circuit is, therefore, a D-C voltage the amplitude of which is directly proportional to the 2400 c.p.s. signal frequency component of the input of the signaling receiver. The amplitude versus frequency characteristic of the D-C output of 2400 c.p.s. detection circuit 20 exhibits a maximum voltage at the center frequency of 2400 c.p.s., with a decrease in amplitude approximately symmetrical about the center frequency as the frequency is either lowered or increased. The output characteristic is a direct function of the selectivity of bandpass filter 30. FIG. 3A depicts the output versus frequency characteristic for such typical bandpass filter having a bandwidth of 200 c.p.s.

Figure 3B:
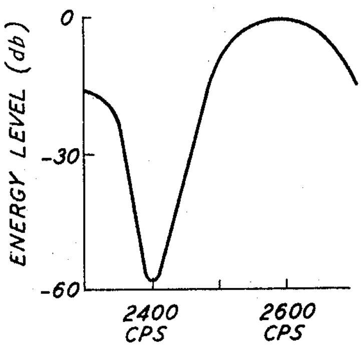

The input to 2600 c.p.s. signal detection circuit 21 is taken from the junction of buffer amplifier 18 and band-elimination filter 19, i.e., after it has passed through 2400 c.p.s. band-elimination filter 17 and buffer amplifier 18. The output versus frequency characteristics of a typical band-elimination filter having a 200 c.p.s. bandwidth is shown in FIG. 3A. This input is therefore equal to the overall trunk energy minus the 2400 c.p.s. signal component. The 2600 c.p.s. signal component, after having been selected from this input in bandpass filter 31, is amplified in amplifier 33, and rectified as well as filtered in rectifier and filter 35. The latter circuit produces two D-C output voltages of opposite polarity but equal amplitude, where the amplitudes are directly proportional to the 2600 c.p.s. signal components present at the input to signal detection circuit 21. However, the output of signal detection circuit 21 is determined by the effects of both 2600 c.p.s. bandpass filter 31 and 2400 c.p.s. band-elimination filter 17. That is, although the maximum output occurs at a center frequency of 2600 c.p.s. due to the effect of 2600 c.p.s. bandpass filter 31, the voltage versus frequency characteristic is not symmetrical about 2600 c.p.s., since a minimum voltage point arises due to the action of 2400 c.p.s. band-elimination filter 17. The amplitude versus frequency characteristic of the 2600 c.p.s. signal detection circuit is illustrated in FIG. 3B.

Figure 3C:
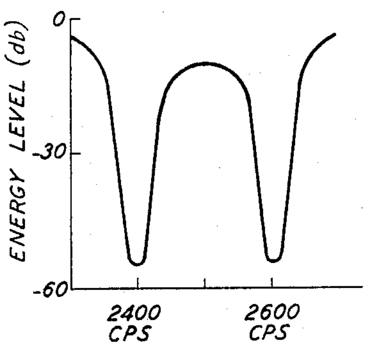

The input to guard detection circuit 22, on the other hand, is equal to the overall signaling receiver input energy minus the signal components of both signal frequencies, since the guard detection circuit input is equal to the output of the path including serially connected band-elimination filters 17 and 19. After this input is amplified in amplifier 36, it is rectified as well as filtered in rectifier and filter 37, to produce a D-C output voltage having the characteristic as depicted in FIG. 3C. A minimum voltage point is produced at each of the signal frequencies of 2400 c.p.s. and 2600 c.p.s., due to the combined action of band-elimination filters 17 and 19.

The D-C output voltages of respective detection circuits are applied to D-C comparators 23 and 24 which weigh the respective signal-to-guard ratios. A typical D-C comparator that may be used in the embodiment of the invention is illustrated in FIG. 2. The circuit simply functions as a switch, which, in response to the sum of the voltages that are being compared, switches its output between a low and a high level. The respective input voltages are applied through individual input resistors 41, 42, and 43 to the base electrode of transistor 44. These resistors may be scaled to properly weigh each individual input voltage. The emitter electrode of transistor 44 is connected directly to a negative 30-volt source, whereas its base electrode is connected to the same voltage source through base resistor 45. The collector electrode of transistor 44 is connected through load resistor 46 to ground as well as through resistor 47 and Zener diode 48 to the base electrode of transistor 49. The Zener diode is poled to allow current flow from the base electrode of transistor 49 towards the collector electrode of transistor 44. The base electrode of transistor 49 is also connected to ground through base resistor 50, whereas its collector electrode is connected through resistor 51 to a negative 48-volt source. The output is taken from the collector electrode of transistor 49.

When the signal-to-guard ratio of a respective comparator input of FIG. 1 exceeds a predetermined threshold level, the input to the comparator of FIG. 2 becomes positive, thereby forward biasing transistor 44. The resulting current flow develops a negative voltage at the collector electrode of transistor 44, which is coupled through resistor 47 and Zener diode 48 to the base electrode of transistor 49, causing it to conduct. Transistor 49 therefore provides for a conduction path to ground for the respective relay it drives, and concurrently develops a step voltage across resistor 51 to energize OR-gate 25, which in turn drives band-elimination filter insertion relay 16. When, on the other hand, the signal-to-guard ratio is less than its respective predetermined threshold level, the input voltage to the comparator is negative. Transistor 44 is therefore turned off, which in turn shuts off transistor 50, causing the respective relays to become de-energized.

In the signaling receiver of FIG. 1, comparator 24 has as its input the D-C output voltages of 2600 c.p.s. detection circuit 21 and guard detection circuit 22; that is, it compares the 2600 c.p.s. "signal" energy with the "guard" energy. Comparator 24 switches states when the ratio of these two input voltages exceeds a predetermined threshold level, i.e., when the 2600 c.p.s. "signal" exceeds the "guard" by such an amount as to be recognizable as a supervisory signal, thereby signaling the presence of such 2600 c.p.s. signal by energizing 2600 c.p.s. relay 27, while at the same time energizing band-elimination filter insertion relay 16 through OR-gate 25. As relay 16 energizes, contacts 16–1 open up and contacts 16–2 close. The receiver input with its voice-frequency message components which had up to this point been routed through the receiver by way of attenuator 15, is therefore being rerouted through the path which includes band-elimination filters 17 and 19, thereby eliminating from the output of signaling receiver 10 the signaling component although such signaling component is present in the input to the signaling receiver.

Figure 3D:
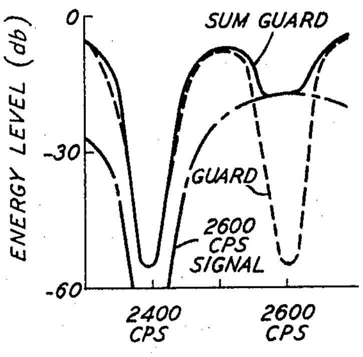
Figure 3E:
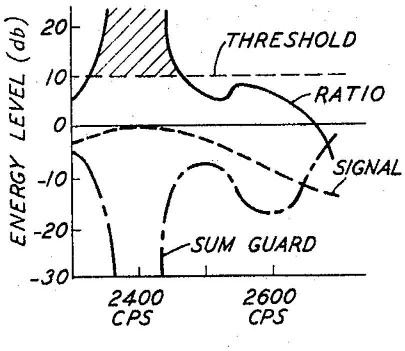

On the other hand, 2400 c.p.s. comparator 23 obtains its inputs from guard detection circuit 22 and 2400 c.p.s signal detection circuit 20 as well as 2600 c.p.s. detection circuit 24. As indicated on FIG. 1, the inputs derived from 2600 c.p.s. signal detection circuit 21 and guard detection circuit 22 are of the same polarity, whereas they are opposite in polarity to the voltage derived from 2400 c.p.s., signal detection circuit 20. Because of this polarity difference together with the action of comparator 23, the 2400 c.p.s. signal is therefore compared to the sum of the guard and the 2600 c.p.s. signal. FIG. 3D illustrates how this summation between the guard and the properly attenuated 2600 c.p.s. signal results in a new "sum-guard" energy. FIG. 3E, on the other hand, illustrates the effects of this summation on the 2400 c.p.s. "signal" to "sum-guard" comparison by D-C comparator 23.

It is evident from FIG. 3E that presence of a 2400 c.p.s. signal component in the input to the signaling receiver results in a signal-to-guard ratio that exceeds the threshold level only in a very narrow region about 2400 c.p.s., whereas at 2600 c.p.s. the ratio is well below the threshold level. The signaling receiver is therefore capable of selecting the 2400 c.p.s. signal component and is able to distinguish it from 2600 c.p.s. signal components, thereby providing for an accurate signal interpretation without false trunk condition indication.

Figure 3F:
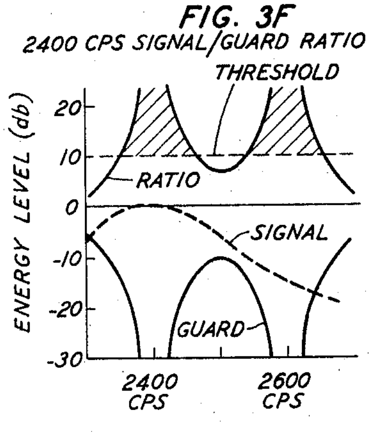

In contrast to these desirable results, FIG. 3F illustrates the performance of the 2400 c.p.s. comparator if in fact the 2400 c.p.s. signal detection output were compared but with the guard by itself rather than with the sum of the guard and the 2600 c.p.s. signal. The two shaded areas indicate that the 2400 c.p.s. comparator would in such case register an output over two frequency regions, namely in the regions of 2400 c.p.s. as well as 2600 c.p.s. Under these circumstances comparator 23 would be unable to distinguish a 2400 c.p.s. signal component from a 2600 c.p.s. signal component and therefore cause false signaling to occur.

The present invention, on the other hand, by adding to the basic guard signal a component of the 2600 c.p.s. signal to produce a "sum-guard" as illustrated in FIG. 3D, substantially eliminates these false signal indications. The selectivity of the two-frequency signaling receiver has therefore been enhanced to such an extent, that the receiver is now able to differentiate between the two signal frequencies, without having had to incorporate costly and bulky, highly selective filters.

It is to be understood that the above-described arrangement is illustrative of the application of the principles of the invention. Numerous other arrangements may be devised by those skilled in the art without departing from the scope of the invention.

What is claimed is:

1. In a telephone system for sending over a telephone trunk to a receiving terminal complex voice-frequency message waves occupying a predetermined frequency band, means to send over said trunk at least a first and second tone each of a predetermined, distinct frequency within said voice-frequency band to signal specific trunk conditions, a plurality of band-elimination filters equal in number to said number of said signaling tones, each of said band-elimination filters individually adapted to block transmission of energy of a respective one of said signaling tones, said band-elimination filters being serially connected with said trunk to produce guard energy proportional to the strength of said voice-frequency message waves outside of the frequencies of said tones, means to compare the energy in said frequency band at the frequency of the highest of said tones to said guard energy, means to compare the energy in said frequency band at the frequency of each of the others of said tones to the sum of the energy of the next higher tone and said guard energy, whereby a respective comparison indicates the presence of a respective tone when the respective tone energy exceeds a predetermined level of said guard energy, and means to serially insert said band-elimination filters between said trunk and said receiving terminal in response to said comparisons, thereby preventing reception in said receiving terminal of energy at the frequency of a signaling tone when the ratio of said guard energy to the energy at a respective tone drops below a predetermined level.

2. In a telephone system for sending over a telephone trunk to a receiving terminal complex voice-frequency message waves occupying a predetermined frequency band, means to send over said trunk first and second tones of predetermined, distinct frequencies within said voice-frequency band to signal specific trunk conditions, first and second band-elimination filters each individually adapted to block transmission of energy of a respective one of said first and second tones, said first and second band-elimination filters being serially connected with said trunk to produce guard energy proportional to the strength of said voice-frequency message waves outside of the frequencies of said tones, means to compare the energy in said frequency band at the frequency of said second tone to said guard energy, means to compare the energy in said frequency band at the frequency of said first tone to the sum of the energy of the second tone and said guard energy, whereby a respective comparison indicates the presence of a respective tone when the respective tone energy exceeds a predetermined level of said guard energy, and means to serially insert said first and second band-elimination filters between said trunk and said receiving terminal in response to said comparisons, thereby preventing reception in said receiving terminal of energy at the frequency of said first and second tones when the ratio of said guard energy to said first and second tone energy, respectively, drops below a predetermined level.

3. The telephone system according to claim 2 in which the first one of said serially connected band-elimination filters is adapted to block tone energy at the lower one of said two tone frequencies, said second band-elimination filter is adapted to block tone energy at the higher one of said two tone frequencies, and said means to produce guard energy includes rectifier and filter means to produce a D-C voltage proportional in amplitude to the energy of the voice-frequency message waves outside of the frequencies of said tones.

4. The telephone system according to claim 3 in which said means to compare the energy in said frequency band at the frequency of said second tone to said guard energy comprises a bandpass filter adapted to pass energy at the frequency of said second tone, said bandpass filter having its input connected to the junction of said first and second band-elimination filters, the output of said bandpass filter being connected to rectifier and filter means to produce a first and a second D-C voltage each proportional in amplitude to the energy at the frequency of said second tone within said input, and a comparator to compare said first D-C voltage proportional to said second tone to said D-C voltage proportional to said guard energy, said means to compare the energy in said frequency band at the frequency of said first tone to the sum of the energy of the second tone and said guard energy comprises a bandpass filter adapted to pass energy at the frequency of said first tone, said bandpass filter having as its input the energy in said frequency band including said signals, the output of said bandpass filter being connected to rectifier and filter means to produce a D-C voltage proportional in amplitude to the energy at the frequency of said first tone within said input, and a comparator to compare said D-C voltage proportional to said first tone to the sum of said second D-C voltage proportional to said second tone and said D-C voltage proportional to said guard energy, whereby said respective comparators switch their output states when in said frequency band the ratio of said guard energy to said first and second tone energy, respectively, drops below a predetermined level, thereby activating said band-elimination insertion means.

References Cited

UNITED STATES PATENTS 2,282,131 5/1942 Hadfield.

KATHLEEN H. CLAFFY, *Primary Examiner.*

J. S. BLACK, *Assistant Examiner.*